(12) United States Patent
Iacopetta

(10) Patent No.: US 8,074,963 B2
(45) Date of Patent: Dec. 13, 2011

(54) FLUID SHUT-OFF DEVICE

(75) Inventor: Cosimo Iacopetta, Bisceglie (IT)

(73) Assignee: Teco S. R. L., Rome (IT)

( * ) Notice: Subject to any disclaimer, the term of this patent is extended or adjusted under 35 U.S.C. 154(b) by 164 days.

(21) Appl. No.: 12/467,623

(22) Filed: May 18, 2009

(65) Prior Publication Data
US 2009/0293975 A1    Dec. 3, 2009

(30) Foreign Application Priority Data

May 29, 2008    (IT) .................. MO08U0012

(51) Int. Cl.
*F16K 51/00*    (2006.01)
(52) U.S. Cl. .................... 251/148; 251/145; 285/387
(58) Field of Classification Search .......... 251/145, 251/146, 147, 148; 285/359, 387, 395
See application file for complete search history.

(56) References Cited

U.S. PATENT DOCUMENTS

| | | | | | |
|---|---|---|---|---|---|
| 4,452,473 | A | * | 6/1984 | Ruschke | 285/81 |
| 4,582,444 | A | * | 4/1986 | Miskinis | 403/16 |
| 5,201,493 | A | * | 4/1993 | Kim | 251/315.05 |
| 5,360,036 | A | * | 11/1994 | Kieper | 137/625.22 |
| 5,516,155 | A | * | 5/1996 | Ko | 285/12 |
| 5,702,374 | A | * | 12/1997 | Johnson | 604/533 |
| 5,797,633 | A | * | 8/1998 | Katzer et al. | 285/243 |
| 6,502,864 | B1 | * | 1/2003 | Savard | 285/12 |
| 6,581,593 | B1 | * | 6/2003 | Rubin et al. | 128/202.27 |
| 7,810,851 | B2 | * | 10/2010 | Wangsgaard | 285/354 |

* cited by examiner

*Primary Examiner* — John Fristoe, Jr.
(74) *Attorney, Agent, or Firm* — Young & Thompson

(57) ABSTRACT

A fluid flow shut-off or control valve or device, for use within the field of irrigation, has at least one end shaped so as to allow coupling of the body with a rotatable ring nut provided with a female thread adapted to be screwed onto a corresponding male thread of a component.

9 Claims, 2 Drawing Sheets

FLUID SHUT-OFF DEVICE

BACKGROUND OF THE INVENTION

The present invention refers to a fluid flow shut-off and control device, bearing an incorporated rotatable quick-connect ring nut. In other words, the invention is a valve or member which serves to control the flow of fluids in pipes, for example by interrupting said flow or allowing it only one direction, such as, for example:
butterfly valve
globe valve
diaphragm valve
plug valve
gate valve
ball valve
needle valve
control valve
check valve
and still various others.

DESCRIPTION OF THE RELATED ART

The prior art provides for the ends of the valve body to be connected, for example, with safety clamps or similar systems.

SUMMARY OF THE INVENTION

Object of the present invention is to make available to the art a fluid flow shut-off and control valve or device wherein one of more ends of the body of said valve is shaped so as to be able to be coupled with a rotatable ring nut provided with a female thread which can be screwed and assembled with the corresponding threaded part of a component with a male thread, such as, for example a manifold, a pipe fitting or the like.

Other advantages that are shown by the present invention can be summed up as:
1. Free ring nut: unlike the usual valves with a female thread, this one does not require thread insulating tape in that it includes a fixed gasket which further reduces assembly times.
2. The gasket is fixed in the ring nut by three protruding lips which avoid accidental loss of said gasket.
3. The shape and structure of the gasket allow the use of pipes of different thicknesses.
4. Unlike the usual valves on the market, the free ring nut allows assembly and removal of the valve body without the need to rotate the entire valve.
5. Positioning of the valve body: unlike the usual valves on the market, the free ring nut allows the desired positioning of the valve body at the end of screwing.

Said objects and advantages are achieved by the fluid flow shut-off and control device of the present invention, which is characterised by what is set forth in the claims below.

BRIEF DESCRIPTION OF THE DRAWINGS

These and other characteristics will be made clearer by the description that follows of some embodiments illustrated, purely by way of non limiting example, in the appended drawings, wherein.

DESCRIPTION OF THE PREFERRED EMBODIMENTS

Figure 1:
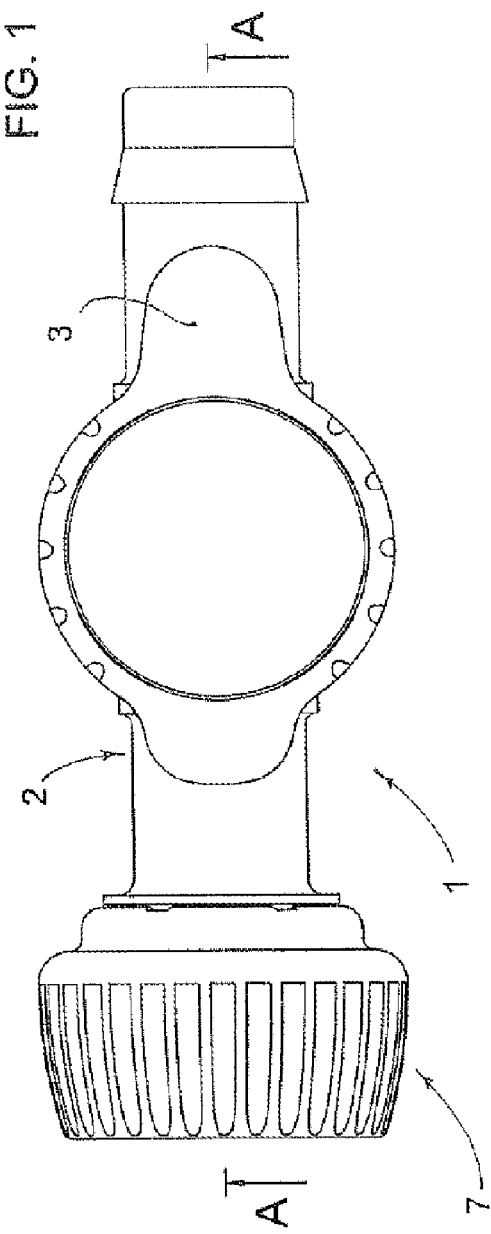
FIG. 1 shows a top view of a fluid flow shut-off and control valve or device of the present invention.
Figure 2:
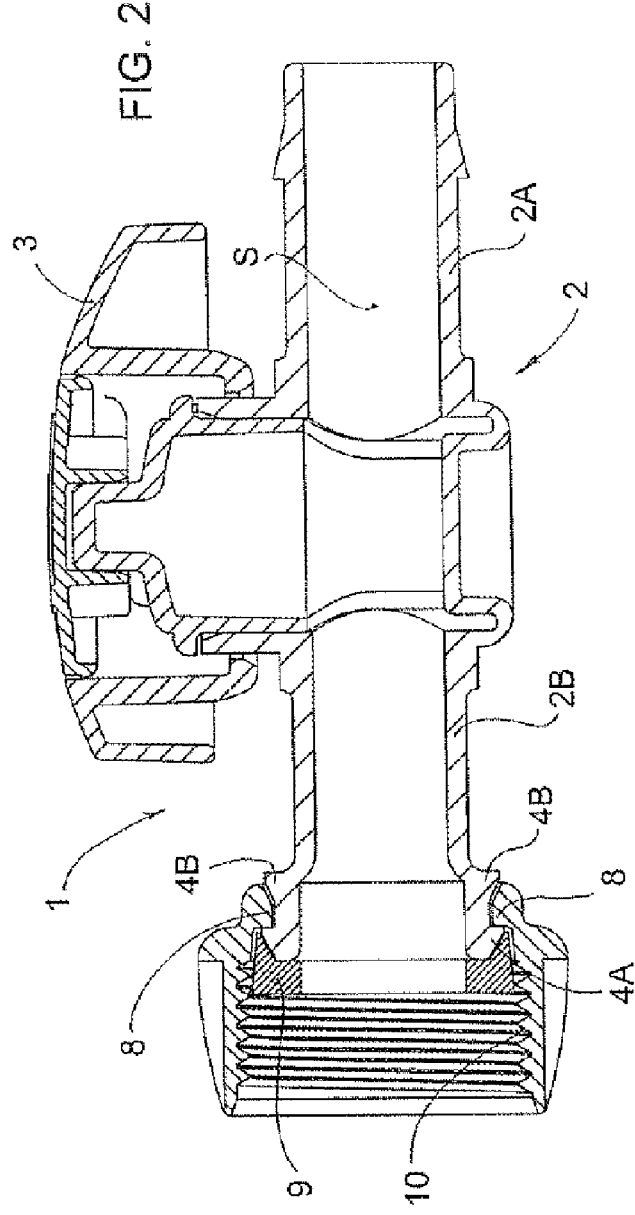
FIG. 2 shows the valve of FIG. 1 sectioned along the plane of section A-A.
Figure 3:
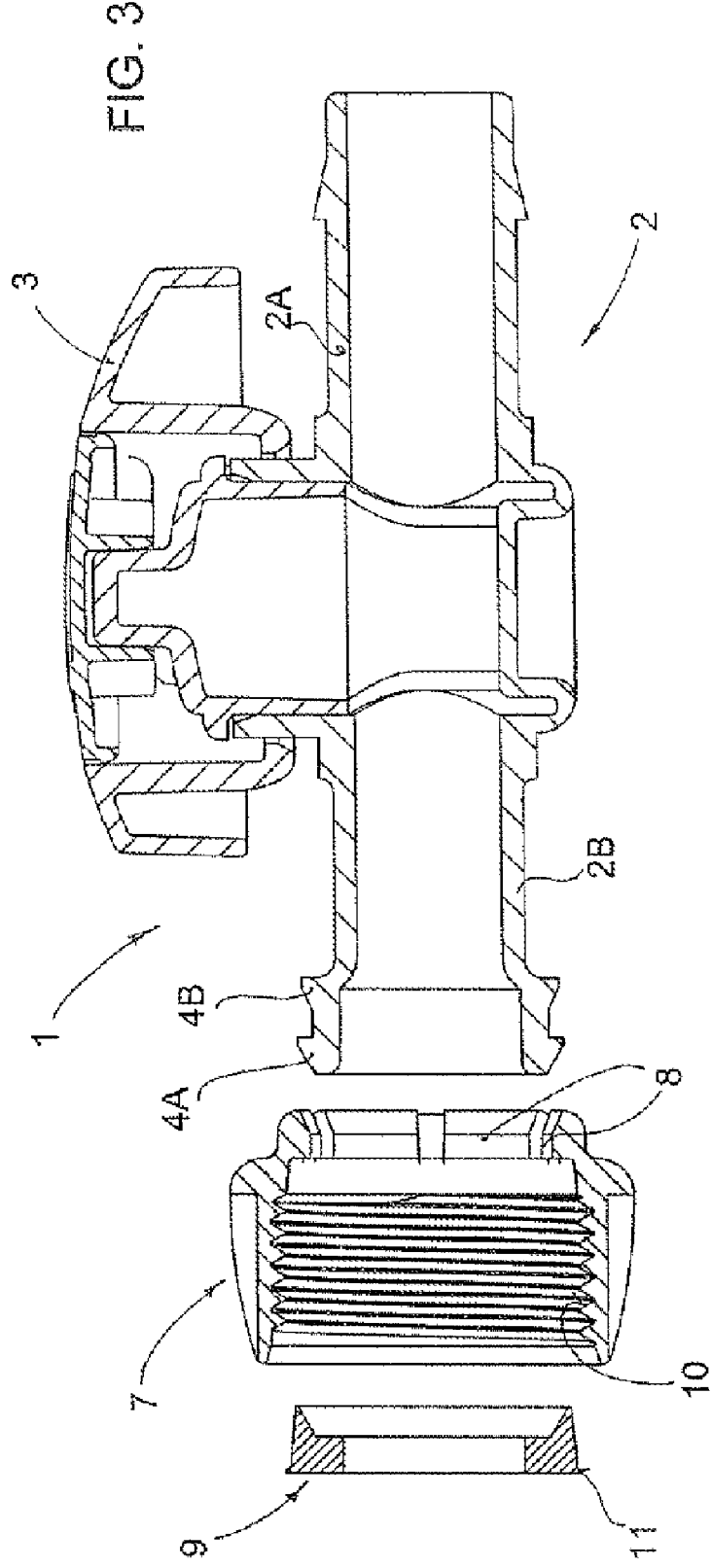
FIG. 3 shows an exploded view of the sectioned valve of FIG. 2.

With reference to FIGS. 1, 2, 3 and 4 the numeral 1 indicates generally a fluid flow shut-off and control member, or valve, according to the present invention.

To be more precise, said valve 1 comprises, as is known, a body 2 wherein is formed the section S for passage of the fluid to be shut off with an appropriate means, controlled by means of a hand lever 3.

The body 2 extends axially so as to define two opposite ends denoted by reference numerals 2A and 2B, for connection to the pipes.

Whilst the end 2A is of the known type, adapted to achieve, for example, coupling with a safety clamp or similar systems, the end 2B is shaped so as to allow coupling of said valve 2 with a rotatable ring nut 7, provided with a female screw which will screw onto the corresponding threaded part of a component with a male thread.

Figure 4:
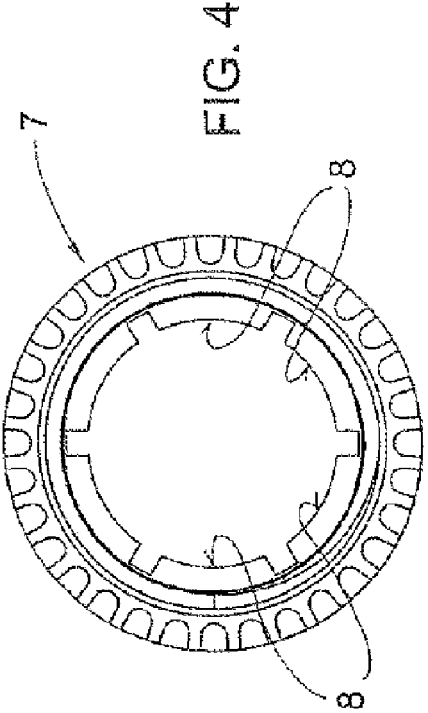
FIG. 4 shows a rear view of the rotatable ring nut with female thread to be associated with the valve body.

More precisely, the end 2B of the body 2 bears a flange 4 with two couplings or to projections (4A, 4B) parallel to each other and adapted to engage corresponding teeth 8 disposed in a circle in the inner space 10 of the ring nut 7 (FIG. 4).

The front projection 4A, that is the one adjacent to the end of the body 2, chamfered to facilitate entry of the teeth 8 into the flange 4 during assembly of the ring nut 7 with the body 2, is adapted to ensure non return of said ring nut, whereas the rear projection 4B, that is the one situated between the first projection 4A and the handle hand lever 3, avoids sliding of the ring nut 7 on the body 2, holding the device 1 in place during rotation of the teeth 8 on the flange 4.

As stated previously, a female thread 10 and a conical gasket 9 the flat seat of which allows the use of pipes of different thicknesses are situated inside the ring nut 7.

The conical gasket 9 has at least one protruding lip 11 (FIG. 3) that engages in the female thread 10 of the ring nut 7 to prevent accidental loss of said gasket, before assembly of the ring nut on the valve body.

In the example reference is made to a valve 1 with a ring nut 7 on one end but it is obvious that this arrangement does not limit the protection requested since the ring nut can be situated on both of the ends illustrated.

The invention claimed is:
1. A fluid flow shut-off and control device (1), comprising:
a body (2) having a section (S) for passage of fluid;
a hand lever (3), the hand lever arranged to shut off the section to prevent the passage of the fluid,
the body extending axially and defining two opposite first end (2A) and second end (2B) for connection to first and second pipes respectively;
a rotatable ring nut (7), the ring nut provided with a female screw which will screw onto a corresponding threaded part of a component with a male thread, the ring nut having teeth (8) disposed in a circle;
a flange (4) located on the first end (2A) of the body, the flange (4) having two projecting couplings (4A, 4B) parallel to each other and defining a front projection (4A) and a rear projection (4B), the teeth (8) of the ring nut engaged between the front and rear projections, the ring nut being retained by the front projection and being rotatable about the first end by the teeth rotating about the front and rear projections, wherein, the front projection is i) chamfered on a first side to facilitate entry of the teeth (8) into the flange (4) during assembly of the ring nut (7) with the body (2), and ii) has a non-return surface on a second side to retain said ring nut and ensure non-return of said ring nut, and the rear projection (4B) prevents sliding of the ring nut (7) onto the body (2), the rear projection holding the ring nut in place during rotation of the ring nut on the flange.

2. The device of claim 1, wherein, the rear projection (4B) has an outside dimension preventing the sliding of the ring nut (7) onto the body (2).

3. The device of claim 2, further comprising:

a conical gasket (9) with first seat facing the front projection and a flat, second seat facing the female screw.

4. The device of claim 3, wherein, the conical gasket has at least one protruding lip (11) that engages in the female thread of the ring nut.

5. The device of claim 1, wherein, an inside diameter of the flange is greater than an inside diameter of the first end of the body adjacent the flange.

6. A fluid flow shut-off and control device (1), comprising:

a body (2) having a section (S) for passage of fluid;

a hand lever (3), the hand lever arranged to shut off the section to prevent the passage of the fluid, the body extending axially and defining two opposite first end (2A) and second end (2B) for connection to first and second pipes respectively;

a rotatable ring nut (7), the ring nut provided with a female screw which will screw onto a corresponding threaded part of a component with a male thread, the ring nut having teeth (8) disposed in a circle;

a flange (4) located on the first end (2A) of the body, the flange (4) having two projecting couplings (4A, 4B) parallel to each other and defining a front projection (4A) and a rear projection (4B), the teeth (8) of the ring nut engaged between the front and rear projections, the ring nut being retained by the front projection and being rotatable about the first end by the teeth rotating about the front and rear projections, an inside diameter of the flange being greater than an inside diameter of the first end of the body adjacent the flange, wherein, the front projection is i) chamfered on a first side to facilitate entry of the teeth (8) into the flange 4 during assembly of the ring nut (7) with the body (2), and ii) has a non-return surface on a second side to retain said ring nut and ensure non-return of said ring nut, and the rear projection (4B) prevents sliding of the ring nut (7) onto the body (2), the rear projection holding the ring nut in place during rotation of the ring nut on the flange.

7. The device of claim 6, further comprising:

a conical gasket (9) with first seat facing the front projection and a flat, second seat facing the female screw.

8. The device of claim 7, wherein, the conical gasket has at least one protruding lip (11) that engages in the female thread of the ring nut.

9. A fluid flow shut-off and control device (1), comprising:

a body (2) within which is formed a section (S) for passage of the fluid to be shut off with a part controlled by a hand lever (3), the body (2) defining two opposite ends (2A, 2B) for connection with pipes, at least one end (2A, 2B) of the body (2) shaped so as to allow coupling of the body (2) with a rotatable ring nut (7) provided with a female thread (10) adapted to be screwed onto the corresponding threaded part of a component with a male thread, the ring nut being retained on the at least one end by a projection of one of two couplings extending from said at least one end, wherein, the at least one end (2A, 2B) of the body (2) comprises a flange (4) with the two projections (4A, 4B), the two projections are parallel to each other and adapted to engage corresponding teeth (8) disposed in the inside space (10) of the ring nut (7), a first projection (4A), of the two projections, adjacent to the end of the body (2), being chamfered to facilitate entry of the teeth (8) into the flange (4) during assembly of the ring nut (7) with the body (2) and ensure non return of said ring nut, a second projection (4B), of the two projections, being situated between the first projection (4A) and the hand lever (3) to prevent sliding of the ring nut (7) on the body (2) and to hold the device (1) in place during rotation of the teeth (8) on the flange (4), the two coupling are located on a flange (4) at an end of the at least one end (2A, 2B) of the body (2), an inside diameter of the flange (4) is greater than an inside diameter of the at least one end (2A, 2B) of the body (2) adjacent the flange, the two projections are parallel to each other and engage corresponding teeth (8) disposed in an inside space (10) of the ring nut (7), a first projection (4A), of the two projections, adjacent to an outside end of the body (2), being chamfered on a first face and having a second face ensuring non-return of said ring nut, and a second projection (4B), of the two projections, being situated between the first projection (4A) and the hand lever (3) shaped to prevent sliding of the ring nut (7) on the body (2) and to hold the device (1) in place during rotation of the teeth (8) on the flange (4).

\* \* \* \* \*